Sept. 30, 1952     I. E. DORSCHNER     2,612,294
SEED HOPPER AND ROTARY AUGER FEEDING TO AUXILIARY HOPPER
Filed April 5, 1948     3 Sheets-Sheet 1

Irvin E. Dorschner
INVENTOR.

BY *Thomas A. O'Brien and Harvey B. Jackson*
Attorneys

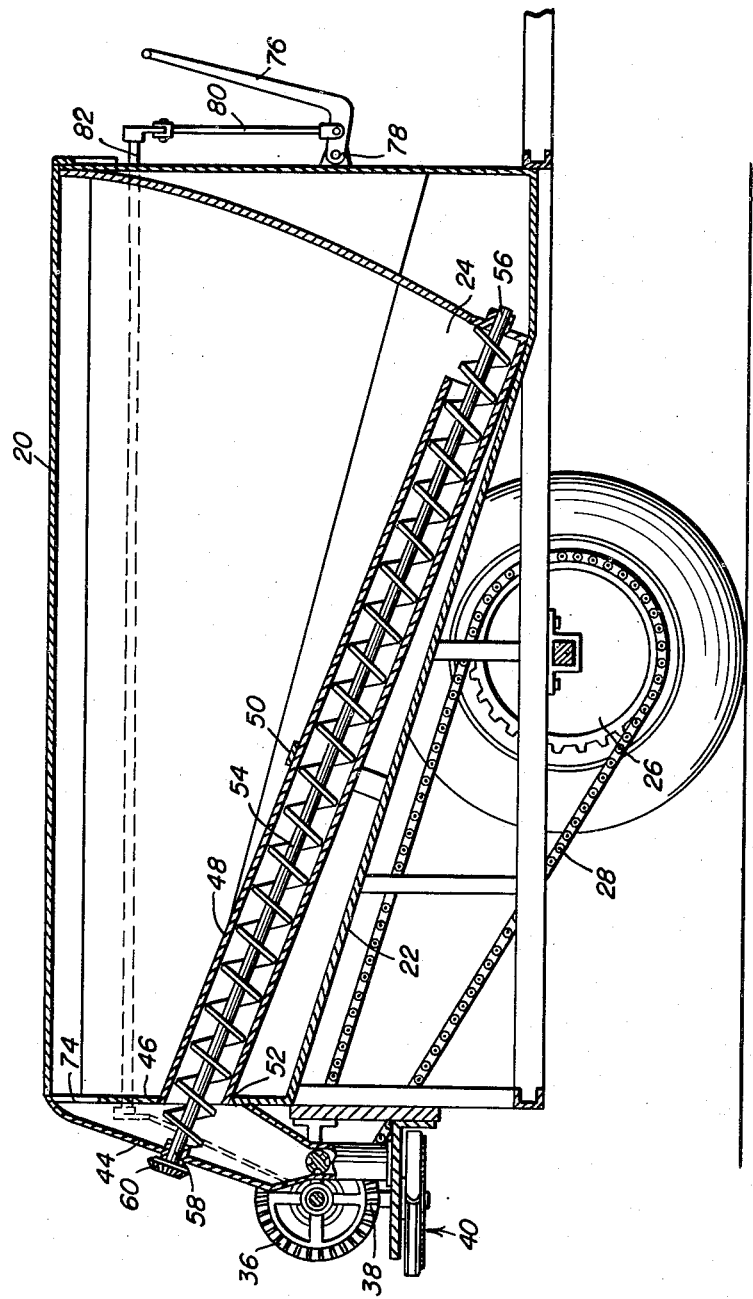

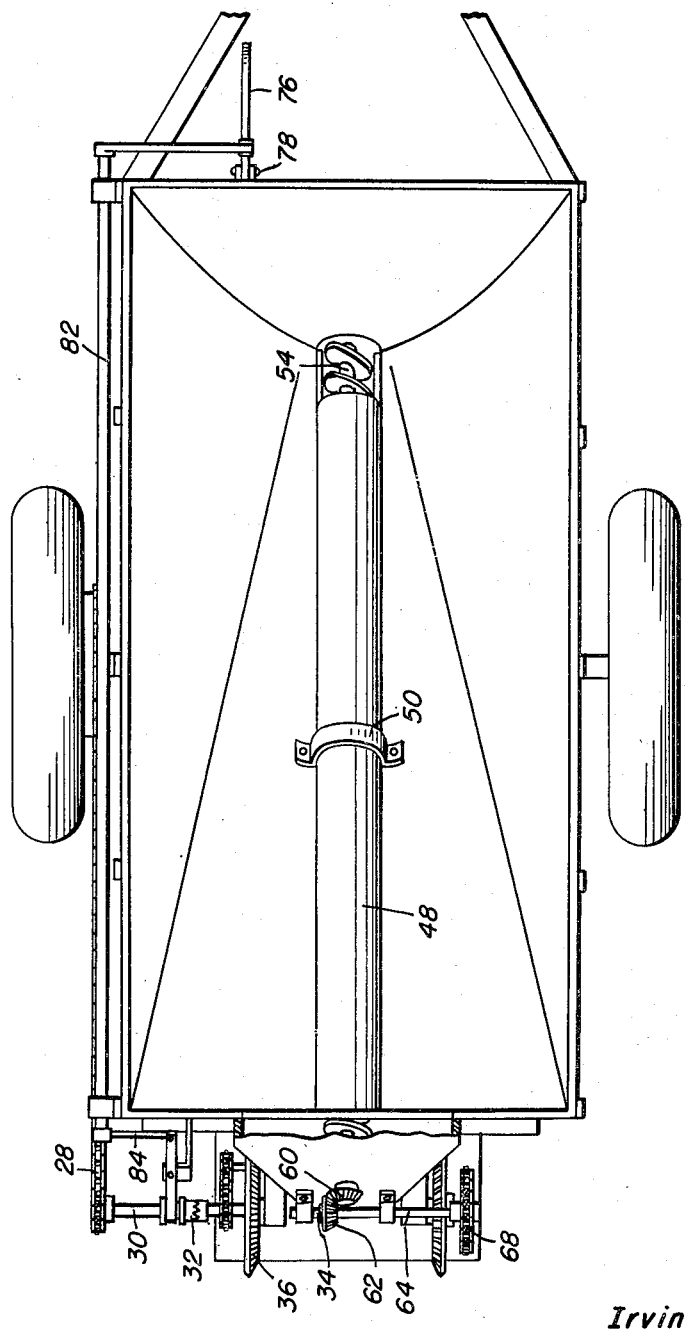

Patented Sept. 30, 1952

2,612,294

UNITED STATES PATENT OFFICE 2,612,294

SEED HOPPER AND ROTARY AUGER FEEDING TO AUXILIARY HOPPER

Irvin E. Dorschner, Jackson County, Minn., assignor of one-half to Bjarne E. Grottum, Jackson, Minn.

Application April 5, 1948, Serial No. 19,005

2 Claims. (Cl. 222—252)

This invention comprises novel and useful improvements in a self-feeding seed hopper and more particularly pertains to an attachment for maintaining the hopper of a tail gate seeder or the like filled from a feed tank of a trailer or wagon to which the seeder is attached.

The principal object of this invention is to provide an apparatus for continuously replenishing the seed supply in the hopper of a tail gate or other seeder from the storage tank carried by the vehicle to which the seeder is attached.

A further object of the invention is to provide an apparatus in accordance with the preceding object which may be readily applied to existing tail gate seeders.

A still further object of the invention is to provide an attachment for maintaining the hopper of the seeder filled with seed, but preventing the forcing of an excess quantity of seeds therein.

An important feature of the invention resides in the provision of a conveyor which is mounted on a tank carried by a wagon or trailer upon which a seeder is positioned, which conveyor is operable synchronously with the operation of the seeder for continuously conveying seeds from the tank to the hopper of the seeder for insuring a constant supply of seeds therein.

A further feature of the invention resides in the provision of an attachment as set forth in the preceding objects and features, wherein the conveyor is directly driven by the seeder and is operated in synchronism therewith.

A further feature of the invention resides in the provision of means for preventing the forcing of an undesired quantity of seeds in the hopper, which means comprises an overflow conduit communicating with the tank and with the hopper above the inlet of the seeder conveyor therein.

These, together with various ancillary features and objects of the invention which will later become apparent as the following description proceeds, are attained by this device, a preferred embodiment of which has been illustrated by way of example only in the accompanying drawings, wherein:

Figure 3 is a vertical longitudinal sectional view taken substantially upon the plane of the section line 3—3 of Figure 2; and, Figure 4 is a top plan view showing the attachment applied to the device of Figure 1.

Figure 1:
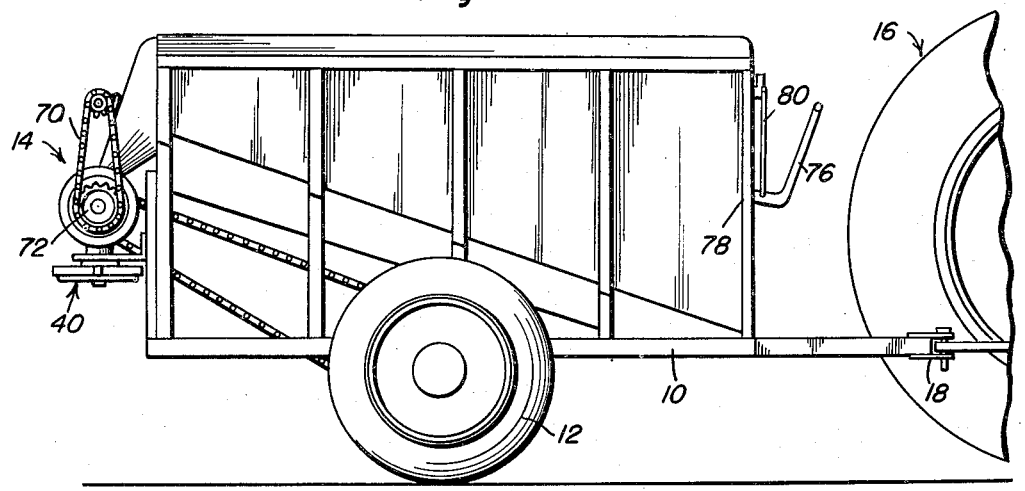
Figure 1 is a side elevational view showing a conventional tail gate seeder mounted upon a trailer, and to which the present invention has been applied.

Referring now more specifically to the accompanying drawings, wherein like numerals designate similar parts throughout the various views, he numeral 10 designates generally a trailer, a ragon or other vehicle which is provided with the customary supporting and driving wheels 12 for operating a seeder, of a known construction and indicated generally by the reference numeral 14. This seeder is preferably mounted upon the end gate of the trailer 10, and may be of a design known as a tail gate seeder. The seeder itself, and its driving mechanism forms no part of the present invention, but merely represents a conventional arrangement and device to which the attachment forming the subject of this invention may be efficaciously applied.

As indicated at 16, a towing vehicle of any desired type, is provided with detachable means 18 for engagement with the trailer 10 for operating the same.

As shown best in Figure 3, the trailer 10 includes a tank or main hopper 20 having an inclined bottom wall 22 the lowermost portion of which is indicated at 24, and which is so shaped that any seed contained within the tank will necessarily accumulate at the lower portion 24.

The wheels 12 drive by means of a sprocket wheel 26 and sprocket chain 28, a suitable sprocket upon a shaft 30, which through a clutch construction 32 operates a transversely mounted shaft 34 secured to the rear end or gate of the trailer 10. This shaft 34 is provided with a pair of driving gears 36 which mesh with driven gears 38, to thereby operate a pair of seeders indicated generally at 40, and of known construction.

These seeders are supplied with grain by means of seed conduits or chutes 42 from an auxiliary hopper 44.

In accordance with this invention, the hopper 44 which is attached to the customary seeder conduits 42, comprises a housing attached in any desired manner to the end wall or gate of the trailer 10, this housing being wider at the top than at the bottom, and has its forward end open for tight abutting engagement against the rear surface of the end wall, indicated at 46, in Figure 3.

Figure 2:
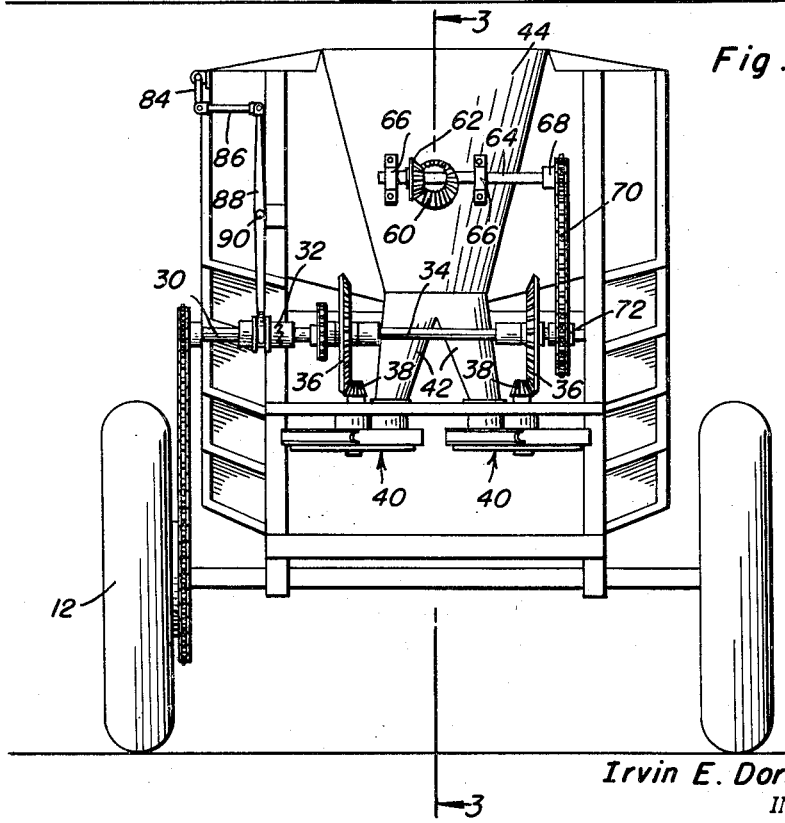
Figure 2 is an end elevational view taken from the left end of the apparatus as shown in Figure 1.

In accordance with this invention, a tubular conduit or casing 48 is secured through the bottom wall 22 of the tank, as by means of a supporting clamp or bracket 50, this casing having its lower end open and terminating at the lowermost portion 24 of the tank, while the upper end thereof extends into and terminates in an aperture 52 formed in the end wall 46, and thus communicating with the interior of the hopper 44. An auger 54 is provided in the casing 48, this auger having extremities journalled as at 56 and 58 in the end wall of the tank 20 and in the hopper 44 respectively, the upper end of the auger being provided with gears 60 thereon. The gear 60, as shown best in Figure 2 is continuously in mesh with a gear 62 carried by a driving shaft 64 journalled as by bracket 66 on the rear wall of the hopper 44, this shaft having a pulley 68 which is connected as by a belt 70 with a corresponding pulley 72 mounted on the above mentioned shaft 34. As will thus be seen, the auger is continuously rotated upon rotation of the seeders 40 and thus constitutes a conveyor for continuously conveying grain from the lowermost portion 24 of the tank 20 into the hopper 44, to thus maintain the latter filled with an ample supply of seeds for discharge through the conduit 42 into the two seeders 40.

In order to prevent forcing an undue quantity of seeds into the hopper 44, the latter has an overflow conduit from its upper end, consisting of an opening 74 in the end wall portion 46, whereby when the hopper is filled with seeds by the conveyor, the excess quantity overflows through the opening 74 back into the tank 20, the device thus maintaining a constant circulation of seeds from the tank to the hopper to insure the maintaining of an adequate supply in the hopper.

In accordance with conventional designs, a control lever 76 is journalled upon the trailer 10, as at 78, and is connected by a connecting link 80 with a rocker shaft 82 which is journalled upon the sides of the tank 20, and at its rear end is provided with a lever arm 84 which is connected by another link 86 with a clutch control lever 88, journalled as at 90 upon the tank and engaging the above mentioned clutch 32.

Thus, the driver of the device from his seat upon the towing vehicle indicated generally at 16, may operate the lever 76 to engage the clutch 32 and thus cause simultaneous operation of the seeder units 40 and the conveyor mechanism.

From the foregoing, the construction, operation and advantages of this device will be readily understood and further explanation is believed to be unnecessary. Since the principles of the invention lend themselves to numerous modifications and adaptations, it is not desired to be limited to the accompanying drawings and attached specification, except as set forth in the appended claims.

Having described the invention, what is claimed as new is:

1. In a seeding machine, a main hopper and an auxiliary hopper, said auxiliary hopper having overflow means adjacent its top for directing seed into the main hopper, said auxiliary hopper also having discharge means adjacent its bottom for directing seed to a seeder, a conveyor tube having its inlet end adjacent the bottom of the main hopper and its outlet end opening into the auxiliary hopper intermediate said overflow means and said discharge means, and a rotary auger in said tube for moving seed through the tube from the main hopper to the auxiliary hopper, said auger projecting from the outlet end of the tube into the auxiliary hopper to constitute an agitator for the seed therein.

2. In a seeding machine, a main hopper and an auxiliary hopper, said auxiliary hopper having overflow means adjacent its top for directing seed into the main hopper, said auxiliary hopper also having discharge means adjacent its bottom for directing seed to a seeder, a conveyor tube having its inlet end adjacent the bottom of the main hopper and its outlet end opening into the auxiliary hopper intermediate said overflow means and said discharge means, and a rotary auger in said tube for moving seed through the tube from the main hopper to the auxiliary hopper, said hoppers having a common wall, said overflow means comprising said wall having an opening therethrough, the main hopper having a bottom wall disposed below the opening in the common wall and which is inclined downwardly from the common wall, said tube being inclined with its inlet end adjacent the lowest end of the bottom wall, said main hopper including vertically inclined side walls which join the bottom wall adjacent its lowest end.

IRVIN E. DORSCHNER.

REFERENCES CITED

The following references are of record in the file of this patent:

UNITED STATES PATENTS

| Number | Name | Date |
|---|---|---|
| 635,836 | Ziegenhorn | Oct. 31, 1899 |
| 932,150 | Louis | Aug. 24, 1909 |
| 1,623,001 | Gollbach | Mar. 29, 1927 |
| 2,115,464 | Kirby | Apr. 26, 1938 |

FOREIGN PATENTS

| Number | Country | Date |
|---|---|---|
| 37,517 | Germany | Nov. 8, 1886 |